United States Patent
Baier

(10) Patent No.: US 11,520,016 B2
(45) Date of Patent: Dec. 6, 2022

(54) LIDAR SYSTEM

(71) Applicant: Robert Bosch GmbH, Stuttgart (DE)

(72) Inventor: Matthias Baier, Lehrensteinsfeld (DE)

(73) Assignee: Robert Bosch GmbH, Stuttgart (DE)

( * ) Notice: Subject to any disclaimer, the term of this patent is extended or adjusted under 35 U.S.C. 154(b) by 924 days.

(21) Appl. No.: 16/366,786

(22) Filed: Mar. 27, 2019

(65) Prior Publication Data

US 2019/0302239 A1 Oct. 3, 2019

(30) Foreign Application Priority Data

Mar. 29, 2018 (DE) .......................... 102018204858.4

(51) Int. Cl.
| | |
|---|---|
| *G01S 7/48* | (2006.01) |
| *G01S 7/481* | (2006.01) |
| *G01S 17/06* | (2006.01) |
| *G02B 26/08* | (2006.01) |
| *G02B 26/10* | (2006.01) |
| *G01S 17/931* | (2020.01) |

(52) U.S. Cl.
CPC ............ *G01S 7/4817* (2013.01); *G01S 17/06* (2013.01); *G01S 17/931* (2020.01); *G02B 26/0875* (2013.01); *G02B 26/10* (2013.01)

(58) Field of Classification Search
CPC ...... G01S 7/4817; G01S 17/06; G01S 17/931; G01S 17/42; G01S 7/481; G02B 26/0875; G02B 26/10
See application file for complete search history.

(56) References Cited

U.S. PATENT DOCUMENTS

| | | | |
|---|---|---|---|
| 6,343,767 B1 | 2/2002 | Sparrold et al. | |
| 7,123,394 B2 | 10/2006 | Rehm et al. | |
| 2002/0033988 A1* | 3/2002 | Morita ................. | G02B 26/122 359/209.1 |
| 2003/0058413 A1* | 3/2003 | Barnhurst .......... | G02B 26/0816 353/46 |
| 2004/0095655 A1* | 5/2004 | Owen ................... | G02B 26/10 359/619 |
| 2016/0274223 A1 | 9/2016 | Imai | |
| 2016/0299170 A1* | 10/2016 | Ito ....................... | G02B 27/0031 |
| 2017/0111621 A1* | 4/2017 | Tian ................... | G02B 26/0875 |
| 2018/0267148 A1* | 9/2018 | Buettner ................ | G01S 17/42 |
| 2019/0011535 A1* | 1/2019 | Park ..................... | G02B 26/106 |

FOREIGN PATENT DOCUMENTS

| | | |
|---|---|---|
| DE | 102012021831 A1 | 5/2014 |
| DE | 102013012789 A1 | 2/2015 |
| EP | 2304489 A1 | 4/2011 |

* cited by examiner

*Primary Examiner* — Hovhannes Baghdasaryan
(74) *Attorney, Agent, or Firm* — Norton Rose Fulbright US LLP; Gerard Messina

(57) ABSTRACT

A LiDAR system which includes an optical system that encompasses a first lens, which is preferably statically positioned, and a second lens, which is preferably rotatably supported in relation to the first lens. The first lens and the second lens are situated along a shared optical path, and at least either the first lens or the second lens is configured to be set into rotation in order to bring about a beam deflection from the optical path in at least one spatial direction.

18 Claims, 2 Drawing Sheets

LIDAR SYSTEM

CROSS REFERENCE

The present application claims the benefit under 35 U.S.C. § 119 of German Patent Application No. DE 102018204858.4 filed on Mar. 29, 2018, which is expressly incorporated herein by reference in its entirety.

FIELD

The present invention relates to a LiDAR system, which includes an optical system that encompasses a first lens, which is preferably statically disposed, and a second lens, which is preferably rotatably supported in relation to the first lens, the first lens and the second lens being situated along a shared optical path.

BACKGROUND INFORMATION

The abbreviation LiDAR stands for light detection and ranging. Like RADAR sensors, the LiDAR method is based on the emission of electromagnetic radiation into the environment. A LiDAR sensor may be implemented as a type of scanner and allows for a distance measurement to objects in the environment. LiDAR is finding increasing use in motor vehicles, for instance to examine traffic in the environment. For example, the distance to or the speed of objects such as automobiles in the environment is able to be determined with the aid of LiDAR. A LiDAR system frequently includes at least one light source, which is often a laser source, and a detector. The light source emits beams of light, i.e., laser beams, for instance, in the direction of an object such as a car, and the detector receives the beam of light reflected by the object. In this way, it is also possible, for instance, to detect the position of the object in order to avoid a collision. When installed in a motor vehicle, for example, the LiDAR system may thus effectively increase the driving safety of the motor vehicle. In addition, LiDAR sensors are able to be used for the precise detection of the environment during an autonomous driving operation.

Scanning LiDAR systems frequently employ a rotating element in order to achieve a horizontal spatial resolution. There are two common approaches in this regard. In the first approach, the entire system including the laser source and the detector is rotating. This is disadvantageous insofar as at least one power supply and at least one data transmission must be realized on the rotating element. The second approach avoids the disadvantages of the first approach in that only a beam-deflection optics is rotating, and the laser source, often also abbreviated to laser, and in most cases also the detector are stationary.

In conventional systems, the beam-deflection optics is a mirror, such as described in German Patent Application Nos. DE102012021831A1 and DE102013012789A1, where the main emission direction (that is to say, the original emission direction of the laser) is unable to be used because the laser sits in the optical path of the transmitted beam. For that reason, the horizontal scanning region is often either rotated by 90°, as is described in German Patent Application No. DE102012021831A1, or the direction of the incident radiation is tilted out of the horizontal plane, e.g., using a mirror such as a polygon mirror.

European Patent No. EP 2 304 489 B1 relates to a device for laser scanning, in particular to a device for scanning a spatial region upstream from a LiDAR system using a focused laser beam. The device includes a first and a second rotatably supported deflector element in the optical path, and a deflection of the radiation passing through is implemented via the rotation of at least one of the deflector elements. By rotating the rotatably supported lens body, the angle between the outer surfaces is variable in order to control the beam deflection, which means that a prism adjustment takes place.

A shortcoming of some LiDAR systems according to the related art is that an asymmetrical behavior with regard to the receiving aperture is produced by the rotation of the horizontal scanning region. In other words, the receiving surface, i.e. the projected surface of the mirror, becomes smaller as the angle of rotation of the mirror increases. A larger mirror is therefore often required in addition.

Another shortcoming of some conventional LiDAR system is the distortion of the vertical scan above the rotation when the laser is tilted out of the horizontal plane. This becomes apparent in particular when large horizontal deflection angles (such as >50) are combined with a large vertical angle of incidence (such as >20°). Toward the edge region, the vertical scanning direction tilts to the horizontal, which reduces the vertical field of view.

SUMMARY

According to the present invention, an example LiDAR system is provided, which includes an optical system that encompasses a first lens, which is preferably statically disposed, and a second lens, which is preferably rotatably supported in relation to the first lens, the first lens and the second lens being situated along a common optical path, and at least one of the first lenses or the second lenses is configured to be set into rotation in order to bring about a beam deflection from the optical path in at least one spatial direction.

The example LiDAR system according to the present invention may have the advantage that a beam deflection in a spatial direction is realizable by rotating at least one lens of the optical system. This makes it possible to use the laser to irradiate the optical system in the beam-deflection plane, and electromagnetic radiation may nevertheless emerge from the LiDAR system in this main emission direction.

Since only one lens has to be rotated, this results in a small moved rotational mass. Only passive components are required on the rotor. As a result, no energy or data connection is necessary on the rotor. The receiving aperture advantageously exhibits a symmetrical behavior, decreasing toward the edges. A combination of a horizontal and vertical scanning direction is made possible. On the transmission and receiving side, the LiDAR system advantageously has its best characteristics in the center of the field of view. The lens system has no, or at most minimal, effects on the beam form. A coaxial and biaxial arrangement is possible. If at least one lens is statically disposed, then its outer surface may serve as a boundary to the environment so that no further optical losses have to be tolerated during a passage through a cover or housing of the LiDAR system, as would otherwise be the case. The LiDAR system may be an automotive LiDAR system, i.e. for an installation in a motor vehicle, or it may also be suitable for installation in some other scanning system that places high demands on the beam form.

The first lens and the second lens do not describe a ranking or sequence of the lenses in the optical system in this sense, but are used only for making them uniquely differentiable, i.e., for better clarity. Alternatively, the first lens may also simply be referred to as a lens and the second lens as a further lens of the optical system.

Advantageous further refinements of the present invention are described herein.

In accordance with an example embodiment of the present invention, the first lens is preferably a statically disposed lens. The second lens is preferably a lens that is rotatably supported with respect to the first lens. In some embodiments, the first lens is a lens that is rotatably supported relative to the second lens. In a few example embodiments of the present invention, the second lens is a static lens. In some embodiments, both the first lens and the second lens are lenses that are rotatably supported relative to each other. Characteristics and advantages that are described in the following text for the second lens as the rotatable lens may mutatis mutandis also be characteristics and advantages of the first lens when the first lens is configured to be rotatable relative to the second lens in specific embodiments. Characteristics and advantages hereinafter described in connection with the first lens as the static lens may mutatis mutandis also be characteristics and advantages of the second lens when the second lens is configured to be static in specific embodiments.

In one special embodiment of the present invention, it is provided that the second lens is rotatably supported in at least one spatial direction. An angular relationship between surfaces of the first lens and surfaces of the second lens may thereby be variable in order to bring about the beam deflection. In other words, an angular position between at least one surface of the first lens and at least one surface of the second lens is variable by rotating the second lens, which induces the beam deflection. In some embodiments, a simple support of the second lens is provided. This easily allows for a rotational support in one spatial direction. However, some embodiments provide for a gimbal-type support of the second lens. The second lens is then rotatably supported so as to allow for a rotary movement in two spatial directions. Gimbal-type supporting is a support using two intersecting pivot bearings that are disposed at a right angle with respect to each other. This makes it possible to ensure a flexible rotary positioning of the second lens.

It is advantageously provided that at least the first or the second lens has at least one curved surface along the optical path. The curved surface of a lens is preferably a convexly curved surface that may be made to face the other lens. The convexly curved surface may thus preferably form an inner surface of one of the two lenses, depending on a rotational position of the rotatable lens. For some rotational positions of the rotatable lens, the convexly curved surface is thus positioned in the optical path in such a way that a beam of light in the optical path must first pass through one of the two lenses until it passes through the convexly curved surface, and it must subsequently pass through the other of the two lenses. If the convexly curved surface is disposed between the lenses because of a suitable selection of the rotational position, then the convexly curved surface is able to be protected from environmental effects by the bodies of the two lenses.

It is preferred that the convexly curved surface is situated adjacent to a concavely curved surface of the other lens that is also positioned in the optical path. The convexly curved surface preferably interacts with the concavely curved surface. The combination of the static and the rotatable lens is preferably realized as a basic principle, the curved surfaces of the lenses being situated opposite each other. While the beam passes through both lenses, the behavior of a prism is obtained, which has different angles of refraction depending on the angle of rotation of the rotatable lens, and thus leads to a beam deflection as a function of the angle of rotation. A compact construction of the prism-type optical system is achieved in this way.

In some embodiments, a gap is formed between the concavely curved surface and the convexly curved surface. This may have an advantageous effect on the service life of the optical system and the rotatability of the rotatable lens. An effect of the gap on the beam shape is able to be eliminated by adapting the radii of curvature. Preferably, the gap is a radially constant gap. Thus, the radii of curvature of the convex and/or concave surface are preferably adapted to provide the radially constant gap between the first lens and the second lens. Preferably, a radius of curvature of the concave surface is therefore adapted for the correction of a gap between the first lens and the second lens. This may also have an advantageous effect on the robustness of the system.

According to one preferred embodiment of the present invention, it is provided that the first lens has the concavely curved surface and the second lens has the convexly curved surface. The second lens may be implemented as a segment of a circle. In a plan view of the segment of a circle, an axis of rotation may then be situated perpendicularly through the center point of an imaginary full circle in which the segment of a circle is situated. A preferred segment of a circle is a semicircle. As a matter of principle, both lenses are realizable both as static and rotatable lenses, the axis of rotation in all embodiments being the same. In other embodiments, it is provided that the first lens has the convexly curved surface and the second lens has the concavely curved surface.

In some embodiments, the first lens lies in the optical path upstream from the second lens, coming from the direction of a light source. This means that the transmitted beam of light in such an arrangement preferably first impinges upon the static lens and then is deflected by the rotatable lens. In this context, the optical system is preferably configured in such a way that only a planar surface of the rotatable, preferably second lens brings about a beam deflection. This restricts the maximum scanning angle. In other embodiments, the second lens lies upstream from the first lens in the optical path, coming from a light source. This means that the arrangement may also be implemented in a mirrored fashion, where the transmitted beam first impinges upon the rotatable lens and then upon the static lens. In this arrangement, considerably larger scanning angles are achievable at the same angle of rotation of the rotatable lens. In addition, the scanning angle that may be achieved in absolute terms in this arrangement is also considerably greater. The receiving aperture is predominantly limited by the lens that is first passed through on the receiving side. An enlargement of the receiving aperture has a reciprocal effect with the required installation space.

It is preferred that at least one further surface of the first lens or the second lens in the optical path has a planar development in each case. Preferably, an outer surface of the first lens and/or an outer surface of the second lens is a planar surface. The outer surface is passed through as the first surface or the last surface of the two lenses in the optical path, in contrast to the inner surfaces described earlier in the text.

In some embodiments of the LiDAR system, the optical system has a pivot mirror in order to allow for a variation of the optical path. Preferably, the pivot mirror is statically situated in the LiDAR system. The pivot mirror is preferably configured to deflect the beam of light in the optical path in the second scanning direction. If scanning in a horizontal plane is made possible by the first scanning direction, then the second scanning direction is preferably used for scanning in a vertical plane. Since both the pivot mirror and the two lenses have only a very slight influence on the beam shape, the optical system may preferably include a beam-forming unit, which includes at least one optical element (e.g., lenses), upstream from the pivot mirror in order to generate the desired beam characteristics for the scan. It is therefore preferred that the LiDAR system has the beam-forming unit, which is configured to impress beam characteristics before the beam of light impinges upon a beam-deflection element of the LiDAR system. Preferred beam-deflection elements are the pivot mirror and/or further lenses in addition to the first lens and the second lens. A detector for the light beam is preferably situated downstream from the pivot mirror in the extension direction of the optical path, which causes a hole in the receiving aperture. This allows for an at least partly coaxial arrangement. In alternative embodiments, a biaxial arrangement is provided. The receiver unit is then shifted to another plane. This in turn presupposes larger lenses, which leads to an enlargement of the installation space. A further effect is a smaller received signal because the receiving path no longer lies on the transmission axis, and views the illuminated spot under an angle because of this axial offset. A preferred pivot mirror is a galvo mirror. Alternatively, it is also possible to use other pivot mirror concepts such as a µ-mirror.

It is preferred that the first lens has two or more facets that are situated at an angle relative to one another in order to parallelize and/or enlarge a field of view. According to embodiments of the present invention, the first lens is made up of two of the several sub-lenses which represent a single facet in each case. In specific embodiments of the present invention, two or more facets disposed at an angle relative to one another are allocated to an inner surface of the second lens in order to parallelize and/or enlarge a field of view. A plurality of separate sub-lenses of the first lenses are then preferably arranged as facets, most preferably three facets. The facets are preferably disposed at angular distances from one another around the second lens, most preferably adjacent to the convexly curved surface of the second lens. The optical system is preferably configured so that a number of static light sources that corresponds to the number of facets is disposed in such a way that each light source is able to irradiate through one facet in each case. The light sources are preferably controlled so that only one light source or two of the light sources is/are jointly active at any time during the rotation of the rotatable, preferably second lens. In a particularly preferred manner, two light sources are simultaneously active. Particularly preferred light sources in the LiDAR system are laser sources. The use of multiple light sources which are arranged to emit radiation toward the optical system, in particular the facets, from different angles makes it possible to achieve a greater scanning angle. Due to a multiple arrangement or multiple facets in the static lens, the system may be partly parallelized in the case of a rotatable lens. This has the result that the receiving aperture is predominantly limited by the facets.

Embodiments of the present invention provide that at least one of the two lenses is rod-shaped. Rod-shaped preferably means cylindrical, most preferably circular-cylindrical. In this way an optical system offering great symmetry is able to be provided, which may allow for the scanning of a large scanning angle at an approximately constant scanning geometry. In a cylindrical development of the lenses, the scanning angle in the second spatial direction is not affected. For example, using a statically disposed pivot mirror, it is possible to first generate a beam that oscillates along a line, which is then additionally deflected in a further spatial direction by the lenses.

In some embodiments, the LiDAR system includes a plurality of laser-detector pairs. The LiDAR system preferably provides a plurality of lasers as light sources that emit light into the optical system at different angles of incidence, preferably toward the pivot mirror. This makes it possible to provide a greater vertical field of view and/or a higher resolution for the LiDAR system. In addition, the maximum deflection of the pivot mirror is able to be reduced.

A preferred detector is a line detector, most preferably an APD array. In comparison with a single APD having the same detector surface, an APD array is able to achieve a better signal-to-noise ratio.

BRIEF DESCRIPTION OF THE DRAWINGS

Exemplary embodiments of the present invention are described in greater detail below.

DETAILED DESCRIPTION OF EXAMPLE EMBODIMENTS

Figure 1:
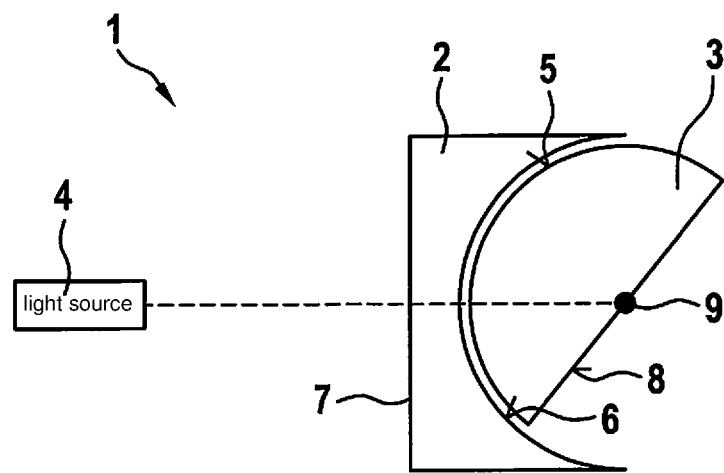
FIG. 1 shows a first exemplary embodiment of the present invention.

FIG. 1 shows a LiDAR system 1 according to a first embodiment in a schematized view. LiDAR system 1 includes an optical system. The optical system encompasses a first lens 2. In this exemplary embodiment, first lens 2 is statically situated. The optical system includes a second lens 3. Second lens 3 in this exemplary embodiment is rotatable in relation to first lens 2. First lens 2 and second lens 3 are situated in a common optical path. The optical path is the path traveled by a beam of light that has been emitted by a light source 4 of LiDAR system 1, which is a laser in this instance. A dashed line in FIG. 1, and also in all of the following figures, indicates an emission direction of the beam of light starting from light source 4. The emission direction is also referred to as the main emission direction here. Light source 4 is statically disposed in relation to first lens 2. Thus, the present invention relates to an optimization of a LiDAR system 1 according to the second approach mentioned in the introduction, in which only the beam deflection optics is rotating, which in this case is second lens 3 of the optical system, and the laser, i.e., light source 4, and frequently also a detector, which is not shown in FIG. 1, are stationary.

The optical system of LiDAR system 1 makes it possible to bring about a beam deflection from the optical path in a spatial direction using first lens 2 and second lens 3. In this way, it is possible to use the laser, i.e., light source 4, to emit radiation toward the optical system in the beam-deflection plane while nevertheless utilizing the main emission direction. While the beam is passing through both lenses 2, 3, the behavior of a prism is obtained which has different angles of refraction depending on the angle of rotation of second lens 3, thereby leading to a beam deflection that is a function of the angle of rotation of second lens 3.

Coming from the laser, i.e., light source 4, the beam of light first passes through first lens 2 and then through second lens 3 in the optical path in the first exemplary embodiment. Second lens 3 is configured so that it is able to be set into rotation in order to induce a beam deflection from the optical path in at least one spatial direction. For this purpose, second lens 3 is rotatably supported in one spatial direction, so that an angular relationship between surfaces of first lens 2 and surfaces of second lens 3 is variable in order to bring about the beam deflection. In this particular case, the support is accomplished with the aid of a simple pivot bearing which allows for the rotation in a plane parallel to the scanning plane of the beam of light.

In the first exemplary embodiment according to FIG. 1, the rotatably supported second lens 3 has a convexly curved, i.e. bulging, surface 5. Convexly curved surface 5 is facing static first lens 2. A gap is formed between concavely curved surface 6 and convexly curved surface 5. Convexly curved surface 5 is an inner surface of second lens 3. More precisely, convexly curved surface 5 is arranged to adjoin a concavely curved surface 6 of first lens 2 that likewise lies in the optical path so that the convexly curved surface 5 interacts with the concavely curved surface 6. In this case, a radius of curvature of convexly curved surface 5 thus corresponds precisely to a radius of curvature of concavely curved surface 6. However, according to some embodiments that are not illustrated, the radius of curvature of convexly curved surface 5 deviates from the radius of curvature of concavely curved surface 6 in order to correct the gap between first lens 2 and second lens 3. In embodiments that are not illustrated, first lens 2 has convexly curved surface 5 and second lens 3 has the concavely curved surface 6.

As illustrated in FIG. 1, at least one further surface 7, 8 of first lens 2 in the optical path has a planar development. Planar surface 7 of first lens 2 is an outer surface of first lens 2 that the beam of light, arriving from light source 4 in the optical path, enters first before passing through first lens 2 and second lens 3.

As shown in FIG. 1, second lens 3 also has a planar surface 8 as a further surface in the optical path. Planar surface 8 of second lens 3 is an outer surface of second lens 3 from which the beam of light, coming from light source 4 in the optical path, emerges last after having passed through first lens 2 and second lens 3. Planar surface 8 of second lens 3 and convexly curved surface 5 form a contour of second lens 3, in a plan view along an axis of rotation 9 of second lens 3. In the plan view along axis of rotation 9, second lens 3 is semicircular. Axis of rotation 9 of second lens 3 extends through a center point of planar surface 8 of second lens 3 and planar surface 8 of second lens 3 in the plan view. The axis of rotation of second lens 3 in the plan view runs through a center point of a circle whose one-half circumference is described by the convexly curved surface 5.

In the arrangement, the transmitted beam, i.e. the beam of light coming from the laser, i.e. light source 4, may first impinge upon the static, plano-concave first lens 2 and then be deflected by the rotatable, plano-convex second lens 3. In this instance, it is only the planar surface, i.e. planar surface 8, of the rotatable lens, i.e., second lens 3 in this case, that brings about a beam deflection, thereby restricting the maximum scanning angle.

Figure 2:
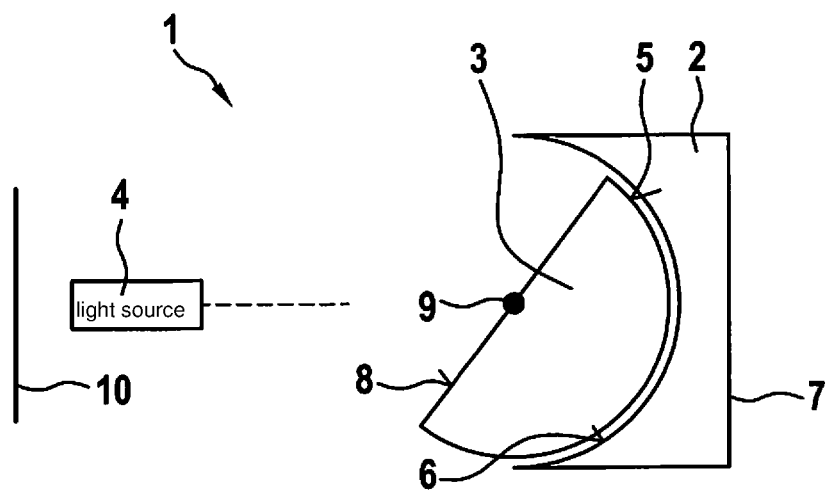
FIG. 2 shows a second exemplary embodiment of the present invention.

FIG. 2 shows a second exemplary embodiment. It uses the same components as the first exemplary embodiment. However, in the second exemplary embodiment, the statically disposed first lens 2 is situated downstream from rotatably supported second lens 3 in the optical path when viewed from the direction of light source 4. This means that the beam of light emitted by light source 4 first passes through second lens 3 and then through first lens 2. This exemplary embodiment is able to achieve large deflection angles in comparison with the first exemplary embodiment.

Similar to the first exemplary embodiment, light source 4, first lens 2, second lens 3, and a detector 10 are coaxially situated relative to one another on a shared mirror-symmetrical system axis. The system axis is congruent with the light beam emitted by light source 4 in the main emission direction leading to second lens 3. Axis of rotation 9 of second lens 3 runs perpendicular to the system axis and through the system axis. An axis of symmetry of first lens 2 runs perpendicular to the system axis and through the system axis. The second exemplary embodiment may therefore have a compact design in comparison with other embodiments.

Figure 3:
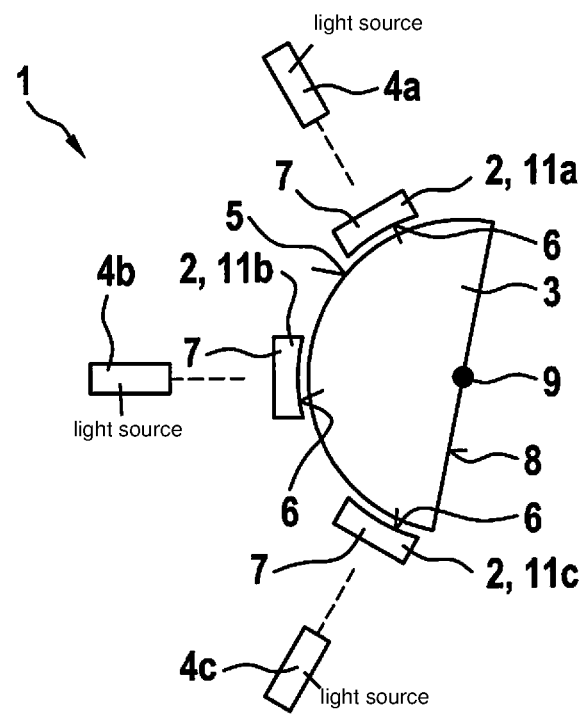
FIG. 3 shows a third exemplary embodiment of the present invention.

In contrast to the exemplary embodiments in FIG. 1 and FIG. 2, the third exemplary embodiment of LiDAR system 1 schematically illustrated in FIG. 3 includes three light sources 4a-c rather than one light source 4, which are situated at an angle relative to one another so that they emit beams of light that are angled relative to one another in a common plane.

In LiDAR system 1 illustrated in FIG. 3, first lens 2 has three facets 11a-c that are situated at an angle relative to one another. The three facets 11a-c are developed as three identical sub-lenses, whose surfaces are configured in a similar manner to that of first lens 2 in the first exemplary embodiment. Each sub-lens thus forms a quasi-stand-alone first lens 2. Facets 11a-c disposed at an angle relative to one another are provided in order to parallelize and enlarge a field of view of the LiDAR sensor. While second lens 3 is rotating, preferably only two of the three light sources 4a-c are active simultaneously. In this particular example, LiDAR system 1 is controlled so that two adjacent light sources 4a-c in each case are active at the same time.

Figure 4:
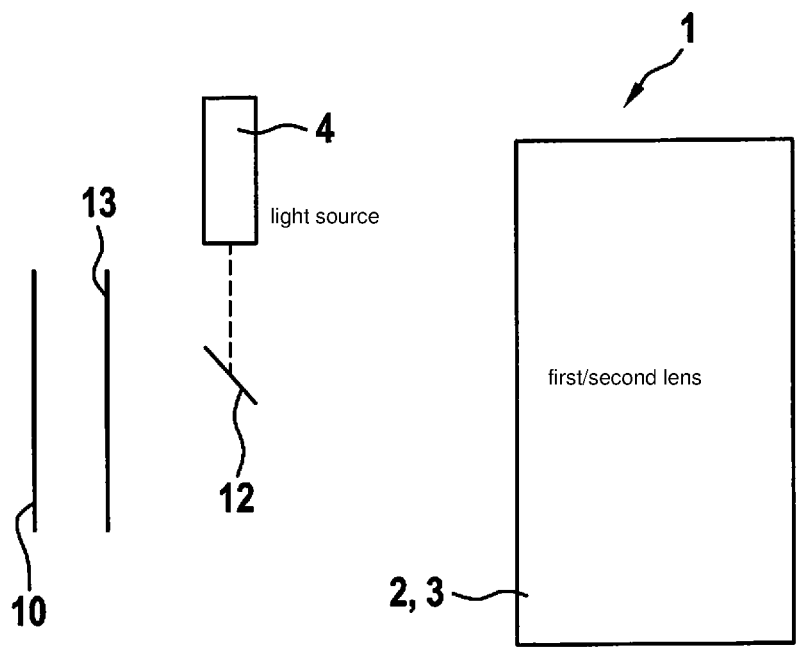
FIG. 4 shows a fourth exemplary embodiment of the present invention.

FIG. 4 shows a fourth exemplary embodiment of LiDAR system 1 in a side view at a right angle to the plan view. The optical system of LiDAR system 1 includes a pivot mirror 12, which is situated in the optical path downstream from light source 4 and upstream from first lens 2 and second lens 3. The pivot mirror allows for a variation of the optical path. This provides an additional scanning device, perpendicular to the scanning direction of the first three exemplary embodiments. In this instance, first lens 2 and second lens 3 have no effect on the scanning direction of the beam of light deflected by pivot mirror 12 due to the direction in which the beam of light passes through first lens 2 and second lens 3, and their cylindrical development.

According to the fourth exemplary embodiment in FIG. 4, detector 10 is situated downstream from pivot mirror 12 in the optical path, for the incident beam of light when it has been deflected by an object to be scanned (not shown). The detection direction of detector 10 lies perpendicular to the emission direction of light source 4. On account of pivot mirror 12, a hole is created in the receiving aperture, because pivot mirror 12 partially shades detector 10 towards first lens 2 and second lens 3. Here, this is also referred to as a partly coaxial arrangement because light source 4 lies laterally with respect to the system axis between detector 10 and pivot mirror 12. A focusing optics 13 is provided for detector 10 in order to focus the incident beam of light on detector 10. Focusing optics 13 is positioned in the optical path between pivot mirror 12 and detector 10 on the system axis.

In some variants, the fourth exemplary embodiment may be developed to include a plurality of laser detector pairs. Multiple lasers are then provided, which are pointing toward pivot mirror 12 at different incident irradiation angles. In addition, the fourth exemplary embodiment may be combined especially with the first exemplary embodiment, the second exemplary embodiment or the third exemplary embodiment in order to provide a LiDAR system 1 that offers two scanning directions. The first scanning direction utilizes the refraction by first lens 2 and second lens 3, while the second scanning direction uses pivot mirror 12, but first lens 2 and second lens 3 have no effect on the second scanning direction. In further embodiments, which are not shown, LiDAR system 1 has a beam-forming unit, which is configured to impress the beam characteristics before the beam of light impinges upon a beam-deflection element of LiDAR sensor 1. In some embodiments that are not shown, for example, a beam formation is provided upstream from pivot mirror 12. In that case as well, a coaxial implementation of LiDAR system 1 is possible. In embodiments that are not shown, a biaxial implementation of LiDAR system 1 is provided in addition. Detector(s) 10 is/are then situated in another plane that is offset with respect to the transmission path.

In the four embodiments illustrated, first lens 2 and second lens 3 are rod-shaped, or more precisely, cylindrical. In a cylindrical embodiment of lenses 2, 3, the scanning angle in the second spatial direction is not affected given a corresponding arrangement, as illustrated earlier in the text by the third exemplary embodiment. As a result, using statically disposed pivot mirror 12, it is possible, for instance, to first generate a beam of light that is oscillating on a line, which is then additionally deflected in a further spatial direction by lenses 2, 3.

It should be understood that in addition to the components described here such as light source 4a-c, detector 10, first lens 2, second lens 3, and pivot mirror 12, LiDAR system 1 may encompass still further components, e.g., a protective glass for encapsulating LiDAR system 1, beam-forming optics, and similar things. However, in order to simplify matters, these further components are neither shown in the figures nor have they been further described above.

Above, a LiDAR system 1 is therefore described which includes an optical system having a first lens 2, which is preferably statically disposed, and a second lens 3, which is preferably rotatably supported in relation to first lens 2, first lens 2 and second lens 3 being situated along a common optical path. At least one of first lens 2 or second lens 3 is configured to allow it to be set into rotation in order to bring about a beam deflection from the optical path in at least one spatial direction. Preferably, a beam deflection in at least one spatial direction at at least one planar surface 7, 8 of first lens 2 or second lens 3 is generated by rotating at least one lens 2, 3.

What is claimed is:

1. A LiDAR system, comprising:
   an optical system which includes a lens that includes (a) a first exterior surface that faces a light source for impingement of light from the light source upon the first exterior surface in an impingement direction and through which the light is received into an interior of the lens and (b) a second exterior surface through which the light exits the lens;
   wherein:
      the lens is formed of a first lens section that includes the first exterior surface and a second lens section that includes the second exterior surface;
      the first lens section includes a first interior surface of the lens and the second lens section includes a second interior surface of the lens;
      the first and second interior surfaces of the lens face each other, such that the light received into the interior of the lens via the first exterior surface passes through the first and second interior surfaces of the lens before exiting out of the lens through the second exterior surface;
      one of the first lens section and the second lens section is rotatable about a rotation axis that is perpendicular to the impingement direction such that an angle of the second exterior surface relative to the first exterior surface is variable by the rotation and such that an angle of one of the first and second exterior surfaces relative to the impingement direction is variable by the rotation in order to bring about a variable beam deflection of the light from the light source in at least one spatial direction; and
      at least one of the following three features (a)-(c):
         (a) the first lens section includes two or more facets that are disposed at an angle with respect to one another in order to parallelize and/or enlarge a field of view;
         (b) the rotation axis runs through a center of the first exterior surface or the second exterior surface; and
         (c) (i) at least one of the first and second interior surfaces of the lens is arched as a convexly curved surface, and (ii) the rotation axis runs through a center point of a circle defined by the convexly curved surface.

2. The LiDAR system as recited in claim 1, wherein the first lens section is statically situated relative to the light source, and the second lens section is rotatably supported in relation to the first lens.

3. The LiDAR system as recited in claim 1, wherein the at least one of the first and second interior surfaces of the lens is arched as the convexly curved surface.

4. The LiDAR system as recited in claim 1, wherein one of the first and second interior surfaces is a convexly curved surface and the other of the first and second interior surfaces is a concavely curved surface, with the convexly curved surface extending into an interior space of the concavely curved surface.

5. The LiDAR system as recited in claim 1, wherein:
   one of the first and second interior surfaces of the lens is a convexly curved surface and the other of the first and second interior surfaces of the lens is a concavely curved surface that is adjacent to the convexly curved surface;
   wherein:
      the first lens section and the second lens section are situated in a shared optical path;
      the rotatability of the one of the first lens section and the second lens section is configured to bring about the beam deflection from the optical path in the at least one spatial direction;
      the adjacent convexly curved surface and concavely curved surface are disposed in the optical path such that the convexly curved surface interacts with the concavely curved surface; and
      a radius of curvature of the concavely curved surface is adapted for a correction of a gap between the first lens section and the second lens section.

6. The LiDAR system as recited in claim 4, wherein the first interior surface is the concavely curved surface and the second interior surface is the convexly curved surface.

7. The LiDAR system as recited in claim 4, wherein the first interior surface is the convexly curved surface and the second interior surface is the concavely curved surface.

8. The LiDAR system as recited in claim 1, wherein at least one of the first and second exterior surfaces is planar.

9. The LiDAR system as recited in claim 1, further comprising a pivot mirror to provide for a variation of an optical path of the light from the light source.

10. The LiDAR system as recited in claim 9, further comprising a beam-forming unit, wherein the beam-forming unit is configured to impress beam characteristics before a beam of the light impinges upon the pivot mirror.

11. The LiDAR system as recited in claim 1, wherein the first lens section includes the two or more facets that are disposed at the angle with respect to one another in order to parallelize and/or enlarge the field of view.

12. The LiDAR system as recited in claim 1, wherein the first lens section and/or the second lens section is rod-shaped.

13. The LiDAR system as recited in claim 1, wherein the LiDAR system includes a plurality of laser-detector pairs.

14. The LiDAR system as recited in claim 1, wherein the light source includes a plurality of light sources, and the first lens section includes a plurality of first lens sub-sections that each faces a respective one of the light sources and that are disposed (a) at angles relative to one another and (b) around the second interior surface of the lens, so that respective focal points of the plurality of first lens sub-sections face different parts of the second interior surface of the lens.

15. The LiDAR system as recited in claim 1, wherein one of the first and second lens sections is shaped as a semicircle.

16. The LiDAR system as recited in claim 1, wherein the rotation axis runs through the center of the first exterior surface or the second exterior surface.

17. The LiDAR system as recited in claim 3, wherein the rotation axis runs through the center point of the circle defined by the convexly curved surface.

18. The LiDAR system as recited in claim 1, wherein:
one of the first and second interior surfaces of the lens is a convexly curved surface and the other of the first and second interior surfaces of the lens is a concavely curved surface that is adjacent to the convexly curved surface;
wherein:
the first lens section and the second lens section are situated in a shared optical path;
the rotatability of the one of the first lens section and the second lens section is configured to bring about the beam deflection from the optical path in the at least one spatial direction;
the adjacent convexly curved surface and concavely curved surface are disposed in the optical path such that the convexly curved surface interacts with the concavely curved surface; and
a radius of curvature of the concavely curved surface differs from a radius of curvature of the convexly curved surface.

\* \* \* \* \*